United States Patent
Porat et al.

(10) Patent No.: US 9,411,985 B2
(45) Date of Patent: Aug. 9, 2016

(54) PASSING HIDDEN INFORMATION USING ATTACK DETECTORS

(71) Applicant: Cisco Technology Inc., San Jose, CA (US)

(72) Inventors: Uri Porat, Jerusalem (IL); David Zivi, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 206 days.

(21) Appl. No.: 14/151,389

(22) Filed: Jan. 9, 2014

(65) Prior Publication Data

US 2014/0208422 A1    Jul. 24, 2014

(30) Foreign Application Priority Data

Jan. 24, 2013   (GB) .................................. 1301261.2

(51) Int. Cl.
  *G06F 21/55*    (2013.01)
  *G06F 21/75*    (2013.01)
  *G06F 21/60*    (2013.01)

(52) U.S. Cl.
  CPC .............. *G06F 21/75* (2013.01); *G06F 21/606* (2013.01)

(58) Field of Classification Search
  CPC ............................... G06F 21/75; G06F 21/606
  USPC .......................................................... 726/22
  See application file for complete search history.

(56) References Cited

U.S. PATENT DOCUMENTS

| | | | |
|---|---|---|---|
| 5,925,868 A | 7/1999 | Arends et al. | |
| 6,575,368 B1 | 6/2003 | Tamburrini et al. | |
| 6,880,752 B2 | 4/2005 | Tarnovsky et al. | |
| 7,061,408 B2 * | 6/2006 | Poechmueller | G11C 7/1006 341/50 |
| 7,193,470 B2 * | 3/2007 | Lee | H03F 1/0222 330/136 |
| 7,405,659 B1 | 7/2008 | Hyde | |
| 7,483,328 B2 * | 1/2009 | Kim | G11C 7/02 365/189.07 |
| 7,590,880 B1 * | 9/2009 | Hershman | G06F 21/558 380/203 |
| 7,894,366 B2 * | 2/2011 | Mangetsu | H04L 12/2697 370/252 |
| 8,253,338 B2 * | 8/2012 | Ashoff | G08B 7/062 315/133 |
| 8,301,890 B2 * | 10/2012 | Kaabouch | G06F 21/558 370/401 |
| 8,781,045 B2 * | 7/2014 | Lo | H03J 1/005 331/176 |
| 8,913,932 B2 * | 12/2014 | Akamatsu | G03G 15/5058 399/301 |
| 2011/0234307 A1 | 9/2011 | Marinet et al. | |
| 2011/0267094 A1 | 11/2011 | La Rosa | |

FOREIGN PATENT DOCUMENTS

EP    1 777 535 A2    4/2007

OTHER PUBLICATIONS

Jun. 7, 2013 Office Communication in connection with prosecution of GB 1301 261.2.

* cited by examiner

*Primary Examiner* — Kambiz Zand
*Assistant Examiner* — Aubrey Wyszynski
(74) *Attorney, Agent, or Firm* — Hahn Loeser & Parks, LLP

(57) ABSTRACT

An electronic device (22) includes a communication interface (36) and a processor (30), which is configured to store and process secret information and to communicate with a host device (24) via the communication interface. An environmental detector (38) is configured to detect a change, relative to a baseline, in an operating environment of the electronic device, and in response to the detected change, to initiate a secure communication between the processor and the host device when the detected change is in a predefined first range, and to invoke a countermeasure against tampering with the device when the detected change is in a predefined second range, disjoint from the first range.

16 Claims, 2 Drawing Sheets

PASSING HIDDEN INFORMATION USING ATTACK DETECTORS

TECHNICAL FIELD

The present invention, in embodiment thereof, relates to electronic devices, and particularly to secure communication between electronic devices.

BACKGROUND

A wide range of techniques has been developed for extracting protected data from supposedly secure integrated circuits, such as processors used in smart cards. Some of these techniques are based on fault generation: intentionally subjecting the processor to abnormal environmental conditions in such a way as to cause malfunctions that provide access secret data. For example, "glitch attacks" deliberately generate a malfunction that causes one or more flipflops to adopt the wrong state, with the result that security measures in the processor software may be bypassed. Glitches that may be used for this purpose include clock frequency transients, power supply transients, and external electrical field transients. Other known types of environmental fault-based attacks involve application of light or heat.

In response to threats of this sort, some smart cards include detectors that sense potentially-threatening environmental changes, such as clock or power glitches. Upon detecting such a change, the detector typically invokes appropriate countermeasures, such as shutting down or otherwise altering operation of the processor to prevent access by the attacker to secret information.

DESCRIPTION OF EXAMPLE EMBODIMENTS

Overview

Figure 1:
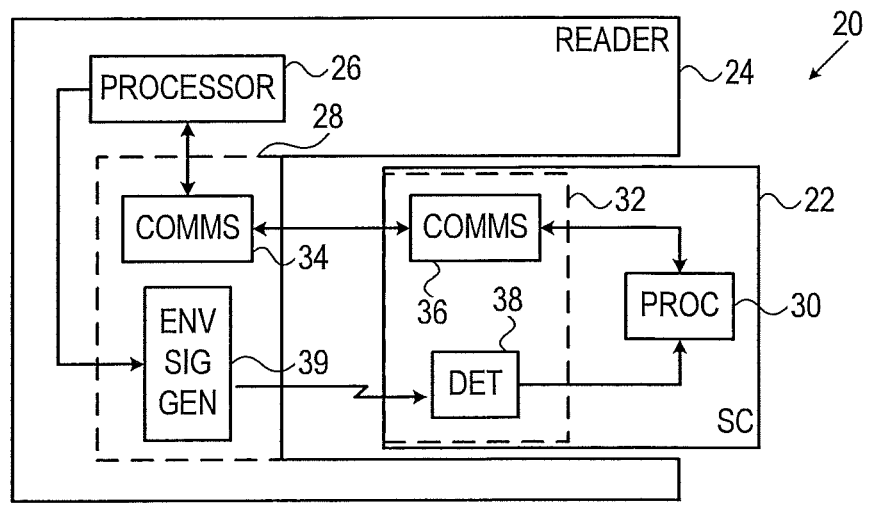
FIG. 1 is a block diagram that schematically illustrates a secure communication system, in accordance with an embodiment of the present invention.

In one embodiment, an electronic device includes: a communication interface; a processor, which is configured to store and process secret information and to communicate with a host device via the communication interface; and an environmental detector, which is configured to detect a change, relative to a baseline, in an operating environment of the electronic device, and in response to the detected change, to initiate a secure communication between the processor and the host device when the detected change is in a predefined first range, and to invoke a countermeasure against tampering with the device when the detected change is in a predefined second range, disjoint from the first range.

Example Embodiments

To foil attacks based on fault generation, secure electronic devices, such as smart cards, often include one or more environmental detectors. Such detectors commonly sense voltage glitches and/or frequency variations. In some cases, detectors may be provided to sense radiation (such as visible, ultraviolet or infrared radiation) and/or temperature changes, which may also be used in some types of fault generation attacks. The terms "environment" and "environmental sensors," as used in the context of the present patent application, refer to the overall operating environment of the electronic device, and other types of environmental parameters and sensors that are used for detection of fault generation attacks may also fall into this category.

When one of these detectors senses a suspicious change in the operating environment, it invokes a countermeasure to prevent any unauthorized attempt to tamper with the device. Examples of such tampering attempts include attempts to access secret information held by the device or to bypass a security checker or otherwise change the behavior and/or content of the device. "Suspicious" typically means that the change of the sensed environmental parameter, relative to a given baseline, is within a predefined range—typically in excess of a predefined threshold. In such a case, the countermeasures invoked by the detector may include issuing an alert and/or triggering a shut-down or reset of the device.

Embodiments of the present invention that are described hereinbelow take advantage of such environmental detectors not only to foil attacks, but also to enhance the secure communication capabilities of the device in question. These embodiments are described here in terms of a "client device" (such as a smart card), which comprises an environmental detector, and a "host device" (such as a smart card reader), which comprises an environmental signal generator, which generates changes in the operating environment of the client device in order to convey signals to the environmental detector. The environmental detector senses these signals, and also senses and responds to suspicious environmental changes.

The terms "client" and "host" are used solely for convenience, however, and do not necessarily designate any sort of client/server or slave/master relationship between the devices in question. Although a particular embodiment that is described below refers, by way of example, to a smart card and a reader as the client and host, the principles of the present invention may similarly be applied between any suitable pair of devices with the requisite capabilities.

In the disclosed embodiments, the client and host devices comprise respective processors and communication interfaces, which are configured to communicate with one another. The client processor stores and processes secret information, which may be vulnerable to fault generation attacks. To initiate a secure communication with the client processor, the host processor actuates the environmental signal generator to generate changes that are within a certain predefined signaling range, relative to a baseline, in the operating environment of the client device. This signaling range is disjoint from the range that is classified by the environmental detector as suspicious.

Thus, upon detecting an environmental change that falls within the signaling range, the environmental detector passes an appropriate communication instruction to the client processor, rather than invoking a countermeasure as it would if the environmental change were in the suspicious range. This approach enables leveraging on existing detection capabilities of the client device. At the same time, it enhances the security of communications between the host and client devices, since an uninformed attacker may not be aware of the environmental changes that are generated by the host device. This additional, environment-based communication layer is also useful in mutual authentication by the host and client devices, since if one of the devices does not support such communication, the other will immediately be able to detect the fraud.

Communications between the environmental signal generator and the environmental detector may take various forms. In some embodiments, the environmental signal may comprise a single bit or a short bit sequence, which simply causes the detector to issue an instruction to the client processor to conduct a secure communication with the host processor via the communication interface. This bit or bit sequence may, for example, raise an "enable" flag or increment a session key. In other embodiments, the host device may generate a sequence of environmental changes, which are sensed by the detector. The sequence may encode a data word, such as a session key, to be used by the client processor in the secure communication, wherein this session key itself may be used in any suitable sort of secure communication protocol that is known in the art.

FIG. 1 is a block diagram that schematically illustrates a secure communication system 20, in accordance with an embodiment of the present invention. In this example, the system comprises a smart card 22, which communicates with a reader 24 via a suitable wired or wireless connection; but as noted earlier, these devices are just one representative instance of application environments in which embodiments of the present invention may be applied. Only those elements of smart card 22 and reader 24 that are essential to an understanding of the present embodiment are shown and described here, as the remaining functions and components required in system 20 will be apparent to those skilled in the art.

Reader 24 comprises a programmable processor 26, which communicates with smart card 22 via a host interface 28. Card 22 similarly comprises a processor 30, which stores and processes secret information and has a client interface 32 for communicating with reader 24. Host interface 28 and client interface 32 comprise respective communication interfaces 34, 36 for data input/output (I/O) operations between reader 24 and card 22. Interfaces 34 and 36 may comprise standard communication components, such as universal asynchronous receiver/transmitter (UART) serial communication chips. In addition, interfaces 28 and 32 may comprise clock and/or power lines (not shown), by which reader 24 conveys a clock signal and/or operating power to card 22.

An auxiliary secret communication channel between reader 24 and card 22 is established by an environmental signal generator 39 in host interface 28 and an environmental detector 38 in client interface 32. As explained earlier, detector 38 is typically present in smart card 22 to alert and invoke preventive action when certain environmental changes occur, such as voltage glitches, clock frequency variations, or changes in temperature or radiation levels (such as the intensity of light incident on the smart card). Signal generator 39 leverages these detection capabilities. In one embodiment of the present invention, the signal generator is associated with communication interface 34 and causes controlled voltage glitches, within a predefined signaling range, in the I/O signal levels, and these glitches are sensed by detector 38. In another embodiment of the present invention, signal generator 39 is associated with the clock signal that is provided by reader 22 to card 24 (possibly as a function of communication interfaces 34 and 36) and causes variation in the frequency of the clock signal. In other embodiments of the present invention, signal generator 39 applies variable levels of radiation or temperature, which are sensed by detector 38. These particular types of environmental signal generators and detectors are cited here by way of example, and other types of changes in the operating environment of smart card 22 that can be generated by reader 24 and detected by card 22 can similarly be used for the present purposes and are considered to be within the scope of the present invention. Optionally, multiple different types of environmental changes can be generated by reader 24 and sensed by smart card 22 for the purposes of these auxiliary communications.

Figure 2:
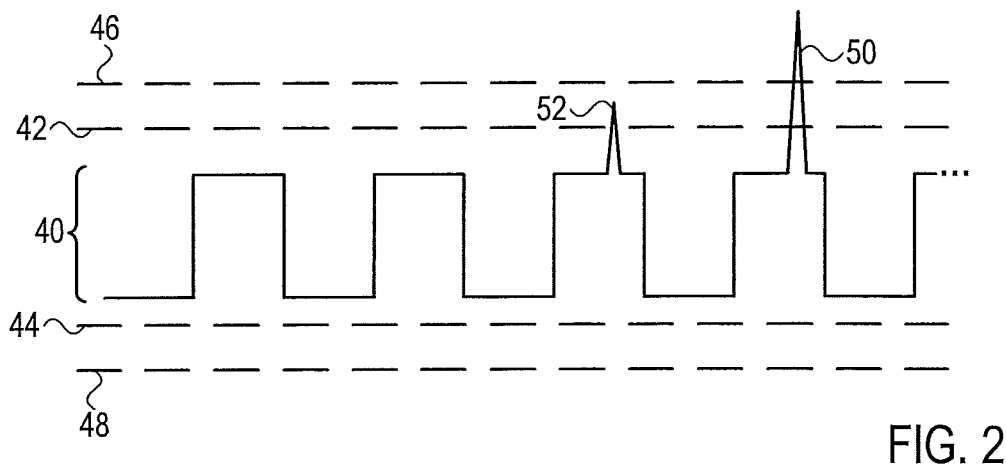
FIG. 2 is a schematic representation of a waveform in which voltage glitches are detected, in accordance with an embodiment of the present invention.

FIG. 2 is a schematic representation of a waveform 40 in which voltage glitches 50, 52 are detected by detector 38, in accordance with an embodiment of the present invention. The normal operating environment in this embodiment is represented by upper and lower signal limits 42 and 44, which characterize the normal (glitch-free) I/O signals that are conveyed from communication interface 34 to communication interface 36. Detector 38 senses any excursions of signal 40 beyond limit 42 or 44 as glitches. These functions of detector 38 may be implemented by a single electronic hardware element or by multiple hardware elements.

In responding to such glitches, detector 38 evaluates whether the glitch voltage exceeds upper and lower thresholds 46 and 48. Glitches in the range that is above threshold 46, such as glitch 50, or below threshold 48 are treated as malicious and cause detector 38 to invoke appropriate countermeasures against a possible fault generation attack. On the other hand, glitches in the intermediate range between limit 42 and threshold 46, such as glitch 52, or between limit 44 and threshold 48 are considered to be signaling glitches, created by environmental signal generator 39. In this latter case, detector 38 passes appropriate instructions to processor 30, by raising an interrupt, for example, and/or setting one or more data bits or passing a data word to the processor. Although only the single glitch 52 is shown in FIG. 2, environmental signal generator 39 may alternatively generate a controlled sequence of such glitches (possibly including negative glitches, as well as the positive glitch shown in the figure) by superimposing pulses onto waveform 40 at appropriate times.

Glitch 52 or a sequence of such glitches within the predefined signaling range may convey information in various forms, for instance:

A single glitch may cause detector 38 to set a flag or increment a register that enables a secure communication exchange between communication interfaces 34 and 36, typically within a specified time limit. Processor 30 in smart card 22 may be configured to execute certain privileged commands transmitted by reader 24 only after first detecting such a glitch.

Alternatively, certain communications or commands may be enabled only after detector 38 senses a certain sequence of glitches within the signaling range. In this case, the detector may count the glitches or compare a pattern of received glitches (by means of an "Exclusive or" (XOR) operation, for example) to a predefined template, and enable the communication or command only when the appropriate count or pattern is received.

A sequences of glitches within the signaling range may encode a certain data word, which may then be used by processor 30 in a subsequent secure communication, as an encryption key, for example. Alternatively, the data word may serve as a key, such as a hash key, to a table of values held by processor 30. Various schemes may be used in this sort of data encoding, for example:

A positive glitch within the signaling range may represent a binary value of 1, while a negative glitch within the signaling range represents binary value of 0.

A clock cycle (or other predefined time slice) with a glitch in the signaling range represents a binary value of 1, while absence of such a glitch represents a binary value of 0.

The above modes of encoding instructions and data in a glitch or glitch sequence are presented above by way of example, and other encoding schemes will be apparent to those skilled in the art after reading the present description. Similarly, the definition of glitch ranges illustrated in FIG. 2 is described above solely by way of example, and other range definitions may likewise be used in alternative embodiment of the present invention. All such alternative schemes and embodiments are considered to be within the scope of the present invention.

Figure 3:
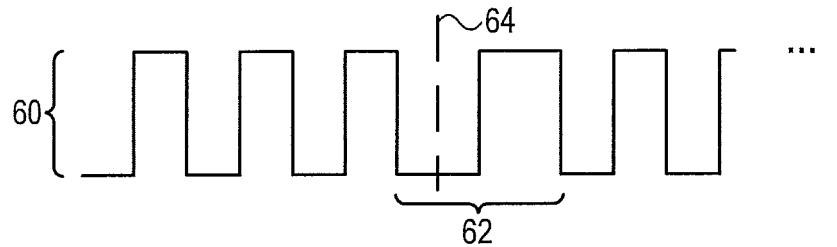
FIG. 3 is a schematic representation of a clock signal in which a frequency glitch is detected, in accordance with an embodiment of the present invention.

FIG. 3 is a schematic representation of a clock signal 60 in which a frequency glitch 62 is detected, in accordance with another embodiment of the present invention. In this case, a frequency detection boundary 64 marks the edge of the range in which detector 38 senses a drop in frequency as an environmental signal. (Detector 38 may, for example, detect a significant increase in frequency as a threat and invoke countermeasures as noted above.) Environmental signal generator 39 may create glitch 62, for example, by writing a new value to the frequency configuration register of communication interface 34, and may then restore the previous frequency value thereafter, as illustrated in FIG. 3. As in the case of voltage glitches described above, generator 39 may create a series of frequency glitches in order to encode a desired data word.

Figure 4:
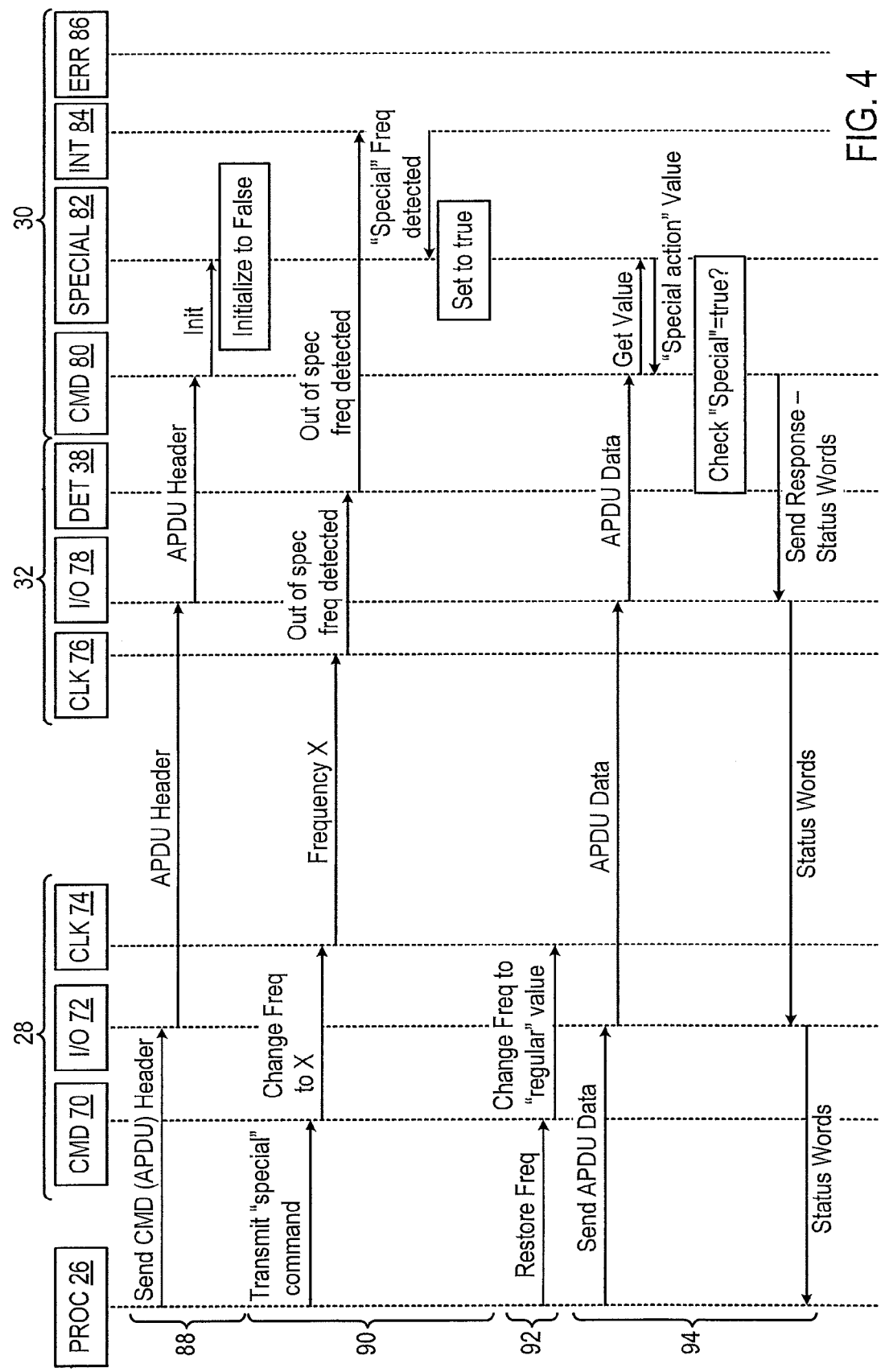
FIG. 4 is a ladder diagram that schematically illustrates a method for secure communications, in accordance with an embodiment of the present invention.

FIG. 4 is a ladder diagram that schematically illustrates a method for secure communications using an environmental auxiliary communication channel, in accordance with an embodiment of the present invention. In this embodiment of the present invention, host interface 28 is assumed to include an I/O line 72 for sending communication signals to client interface 32 and a clock output 74 to client interface 32. The host interface also includes a command register 70, to which environmental signal generator 39 writes values in order to vary the frequency of clock output 74, under control of processor 26. Client interface 32 includes a clock input 76, which is coupled to receive the clock signal from clock output 74, and an I/O line 78 coupled to communicate with I/O line 72. Detector 38 in this case is configured to detect frequency glitches, as in the embodiment of FIG. 3.

A number of hardware and software components of client processor 30 are involved in this embodiment of the present invention. A command handler 80 receives and implements software instructions from host processor 26. The command handler uses a "special action" variable 82, which is held in a suitable memory address or register. In the present scenario, it is assumed that variable 82 is Boolean, although processor 30 may alternative maintain and use multi-bit special action variables, as described above. An interrupt handler 84 is invoked by detector 38 when a signaling glitch is detected. When detector 38 detects a glitch in the suspicious range, it invokes an error handler 86, which may comprise hardware logic, to implement the appropriate countermeasures. This error handler is not used in the scenario shown in FIG. 4, however.

In an initial exchange 88, before secure communications between reader 24 and card 22 begin, host processor 26 generates a command to host interface 28 in order to initialize special action variable 82. In response to this command, I/O line 72 passes a corresponding application protocol data unit (APDU) header to I/O line 78, which passes the APDU header along to command handler 80. The command handler accordingly initializes the value of variable 82 to "False."

When processor 26 is subsequently ready to begin a secure communication, it initiates a communication enablement exchange 90, in order to change the value of variable 82 to "True." For this purpose, processor 26 writes a "special command" to command register 70, which causes interface 28 to change the frequency of clock output 74. When the clock signal with changed frequency reaches clock input 76 of smart card 22, detector 38 senses and evaluates the change in frequency. Upon deteitnining that the change is within the signaling range (and not the suspicious range), detector 38 raises interrupt 84, which causes processor 30 to set variable 82 to "True." Shortly after generating this frequency glitch, processor 26 writes a new command to register 70, in a clock restoration exchange 92, which causes clock output 74 to return the clock frequency to its previous, normal value.

In a secure communication exchange 94, host processor 26 now sends APDU data via I/O lines 72 and 78 to command handler 80. Upon receiving the data, command handler 80 checks the value of special action variable 82. If the value is "False," the command handler will make no response or will respond that an error has occurred. In the present case, however, upon determining that variable 82 is "True," command handler 80 responds by transmitting the appropriate status words via I/O lines 78 and 72 to processor 26. Authenticated communications may then proceed.

The use of glitches to convey information in the manner described above will be largely invisible to a hacker who attempts sniff the communications between reader 24 and card 22 and will be very difficult for the hacker to reproduce. Furthermore, even when users are able to access and change the software or firmware of an existing reader device, they will still not have access to the hardware capabilities necessary to generate the appropriate glitches. Thus, only authorized reader devices with appropriate glitch-generation hardware will be able to communicate with the smart card (or other secure device that is protected in this manner).

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An electronic device, comprising:
a communication interface;
a processor, which is configured to store and process secret information and to communicate with a host device via the communication interface; and
an environmental detector, which is configured to detect a change, relative to a baseline, in an operating environment of the electronic device, and in response to the detected change, to initiate a secure communication between the processor and the host device when the detected change is in a predefined first range, and to invoke a countermeasure against tampering with the device when the detected change is in a predefined second range, disjoint from the first range, the environmental detector being operative to issue to the processor, when the detected change is in the predefined first range, an instruction to conduct the secure communication with the host device via the communication interface, the host device being operative to actuate an environmental signal generator to generate changes that are within the predefined first range, relative to the baseline, in the operating environment of the electronic device, wherein the change detected by the environmental detector comprises at least one of the following:
  a glitch in a voltage that is input to the electronic device;
  a variation in a frequency of a clock that is provided to the electronic device;
  a change in radiation; and
  a change in temperature.

2. The device according to claim 1, wherein the change detected by the environmental detector comprises a glitch in a voltage that is input to the electronic device.

3. The device according to claim 1, wherein the change detected by the environmental detector comprises a variation in a frequency of a clock that is provided to the electronic device.

4. The device according to claim 1, wherein the environmental detector comprises a radiation sensor.

5. The device according to claim 1, wherein the environmental detector comprises a temperature sensor.

6. The device according to claim 1, wherein the detected change comprises a sequence of changes within the first range, which together encode a data word to be used by the processor in the secure communication.

7. The device according to claim 1, wherein the communication interface, the processor, and the environmental detector are encapsulated in a smart card.

8. Electronic apparatus, comprising:
  (a) a client device, which comprises:
    a client communication interface;
    a client processor, which is configured to store and process secret information; and
    an environmental detector, which is configured to detect a change in an operating environment of the client device; and
  (b) a host device, which comprises:
    a host communication interface, which is configured to communicate with the client communication interface;
    a host processor; and
    an environmental signal generator, which is configured to generate changes within a predefined first range, relative to a baseline, in the operating environment of the client device,
  wherein the environmental detector is configured, in response to the detected change, to initiate a secure communication between the client processor and the host processor when the detected change, relative to the baseline, is in the first range, and to invoke a countermeasure against tampering with the client device when the detected change, relative to the baseline, is in a predefined second range, disjoint from the first range, and
  wherein the change detected by the environmental detector comprises at least one of the following: a glitch in a voltage that is input to the client device; a variation in a frequency of a clock that is provided to the client device; a change in radiation; and a change in temperature.

9. The apparatus according to claim 8, wherein the changes in the operating environment of the client device comprise one or more of the following:
  a glitch in a voltage that is input to the client device by the host device;
  a variation in a frequency of a clock that is supplied to the client device by the host device;
  comprise a variation in a level of radiation directed to the client device by the host device;
  a variation in a temperature of the client device that is applied by the host device.

10. The apparatus according to claim 8, wherein the host processor is configured to actuate the environmental signal generator so as to cause the environmental detector to issue an instruction to the client processor to conduct the secure communication with the host processor via the client communication interface.

11. The apparatus according to claim 8, wherein the host processor is configured to encode a data word, to be used by the client processor in the secure communication, in a sequence of the changes that are within the first range.

12. The apparatus according to claim 8, wherein the client device comprises a smart card, and wherein the host device comprises a smart card reader.

13. A method for communication, comprising:
  coupling a processor in a client device, which stores and processes secret information, to communicate with a host device via a communication interface;
  detecting a change, relative to a baseline, in an operating environment of the client device; and
  in response to the detected change:
  initiating a secure communication between the processor and the host device when the detected change is in a predefined first range; and
  invoking a countermeasure against tampering with the client device when the detected change is in a predefined second range, disjoint from the first range; and
  issuing to the processor, when the detected change is in the predefined first range, an instruction to conduct the secure communication with the host device via the communication interface, the host device being operative to actuate an environmental signal generator to generate changes that are within the predefined first range, relative to the baseline, in the operating environment of the electronic device,
  wherein the change detected comprises at least one of the following:
    a glitch in a voltage that is input to the electronic device;
    a variation in a frequency of a clock that is provided to the electronic device;
    a change in radiation; and
    a change in temperature.

14. The method according to claim 13, wherein detecting the change in the operating environment comprises detecting one or more of the following:
  a glitch in a voltage that is input to the client device by the host device
  a variation in a frequency of a clock that is supplied to the client device by the host device;
  a variation in a level of radiation directed to the client device by the host device;
  a variation in a temperature of the client device that is applied by the host device;
  detecting a sequence of changes that are within the first range and encode a data word, to be used by the client device in the secure communication.

15. The method according to claim 13, wherein detecting the change comprises detecting a sequence of changes that are within the first range and encode a data word, to be used by the client device in the secure communication.

16. The method according to claim 13, wherein the client device comprises a smart card, and wherein the host device comprises a smart card reader.

* * * * *